US012786130B2

(12) United States Patent
Parekh et al.

(10) Patent No.: US 12,786,130 B2
(45) Date of Patent: Nov. 3, 2026

(54) SYSTEMS AND METHODS FOR CLASSIFYING TRAFFIC IN A HIERARCHICAL SD-WAN NETWORK

(71) Applicant: Cisco Technology, Inc., San Jose, CA (US)

(72) Inventors: Jigar Parekh, Fremont, CA (US); Mrigendra Patel, Milpitas, CA (US); Sanjay Sreenath, San Jose, CA (US); Laxmikantha Reddy Ponnuru, San Ramon, CA (US); Satyajit Das, Lake Tapps, WA (US); Kaiyuan Xu, Sunnyvale, CA (US); Hari Krishna Donti, Dublin, CA (US); Tahir Ali, San Jose, CA (US); Hamzah Shuaib Kardame, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 454 days.

(21) Appl. No.: 17/815,614

(22) Filed: Jul. 28, 2022

(65) Prior Publication Data

US 2023/0344775 A1 Oct. 26, 2023

Related U.S. Application Data

(60) Provisional application No. 63/332,828, filed on Apr. 20, 2022.

(51) Int. Cl.
*H04L 47/24* (2022.01)
*H04L 45/76* (2022.01)

(52) U.S. Cl.
CPC .............. *H04L 47/24* (2013.01); *H04L 45/76* (2022.05)

(58) Field of Classification Search
CPC ................................ H04L 47/24; H04L 45/76
See application file for complete search history.

(56) References Cited

U.S. PATENT DOCUMENTS

| | | | | |
|---|---|---|---|---|
| 7,936,780 | B1 | 5/2011 | Kompella | |
| 2002/0010799 | A1* | 1/2002 | Kubota | H04L 45/00 709/245 |
| 2016/0164782 | A1 | 6/2016 | Wang et al. | |
| 2016/0255118 | A1 | 9/2016 | Wang | |
| 2018/0351882 | A1 | 12/2018 | Jeganathan et al. | |
| 2019/0058657 | A1 | 2/2019 | Chunduri et al. | |
| 2020/0177503 | A1* | 6/2020 | Hooda | H04L 12/4641 |
| 2021/0067442 | A1 | 3/2021 | Sundararajan et al. | |

(Continued)

OTHER PUBLICATIONS

"Security Basics Guide for Security Devices," Jul. 18, 2017. (Year: 2017).*

(Continued)

*Primary Examiner* — Andrew C Georgandellis
(74) *Attorney, Agent, or Firm* — Baker Botts L.L.P.

(57) ABSTRACT

In one embodiment, a method includes receiving, by a network node, traffic within a hierarchical software-defined wide area network (SD-WAN) network. The method also includes determining, by the network node, a destination region of the traffic. The destination region is within the hierarchical SD-WAN network. The method further includes classifying, by the network node, the traffic based on a destination match condition. The destination match condition is associated with two or more destination regions.

17 Claims, 6 Drawing Sheets

(56) References Cited

U.S. PATENT DOCUMENTS

| | | | | |
|---|---|---|---|---|
| 2022/0353190 | A1* | 11/2022 | Ramaswamy ...... | H04L 12/4645 |
| 2023/0080537 | A1* | 3/2023 | Ramanathan ....... | H04L 47/2475 709/238 |

OTHER PUBLICATIONS

International Search Report and Written Opinion corresponding to PCT Patent Application No. PCT/US2023/017999, dated Jun. 26, 2023, 14 pages.
Liu Ruxia et al., "A QoS Routing Optimization Algorithm Based on Hierarchical Multi-Controller Coordination", 2019 IEEE 4th Advanced Information Technology, Electronic and Automation Control Conference (IAEAC), IEEE, vol. 1, Dec. 20, 2019 (Dec. 20, 2019), pp. 1820-1825, XP033715108, DOI: 10.1109/IAEAC47372.2019. 8997564 [retrieved on Feb. 12, 2020] abstract sections I, II, III.
Chen Qian et al., "A Scalable and Resilient Layer-2 Network With Ethernet Compatibility", IEEE/ACM Transactions on Networking, IEEE / ACM/ New York, NY, US, vol. 24, No. 1, Feb. 1, 2016 (Feb. 1, 2016), pp. 231-244, XP058261735, ISSN: 1063-6692, DOI: 10.1109/TNET.2014.2361773 abstract sections V.A., VII.
Hopps C., "Analysis of an Equal-Cost Multi-Path Algorithm," Network Working Group, Request for Comments: 2992, Category: Informational, Nov. 30, 2000, 8 pages.
Office Action for Indian Application No. 202447048171, dated Sep. 1, 2026, 11 Pages.
Thaler D., et al., "Multipath Issues in Unicast and Multicast Next-Hop Selection," Network Working Group, RFC: 2991, Nov. 2000, pp. 1-9.

* cited by examiner

SYSTEMS AND METHODS FOR CLASSIFYING TRAFFIC IN A HIERARCHICAL SD-WAN NETWORK

CROSS-REFERENCE TO RELATED APPLICATIONS

This application claims benefit of U.S. Provisional Patent Application No. 63/332,828 filed Apr. 20, 2022 by Jigar Parekh et al., and entitled "SYSTEMS AND METHODS FOR FORWARDING TRAFFIC IN A HIERARCHICAL SD-WAN NETWORK," which is incorporated herein by reference as if reproduced in its entirety.

TECHNICAL FIELD

The present disclosure relates generally to communication networks, and more specifically to systems and methods for classifying traffic in a hierarchical software-defined wide area network (SD-WAN) network.

BACKGROUND

Large multi-geographic SD-WAN networks are typically broken down into regions for scale and administration. A hierarchical SD-WAN solution provides a simple and scalable option by segmenting the network into multiple access regions connected together by a core region. In certain embodiments, border routers sit at the edge of the access and core regions while edge routers act as sentinels for traffic entering the access regions. The core region typically acts as a transit for traffic between the access regions. Due to the architecture of the hierarchical SD-WAN network, the existing policy constructs have some constraints with capturing the different traffic flows at the border routers and edge routers.

DESCRIPTION OF EXAMPLE EMBODIMENTS

Overview

Figure 1:
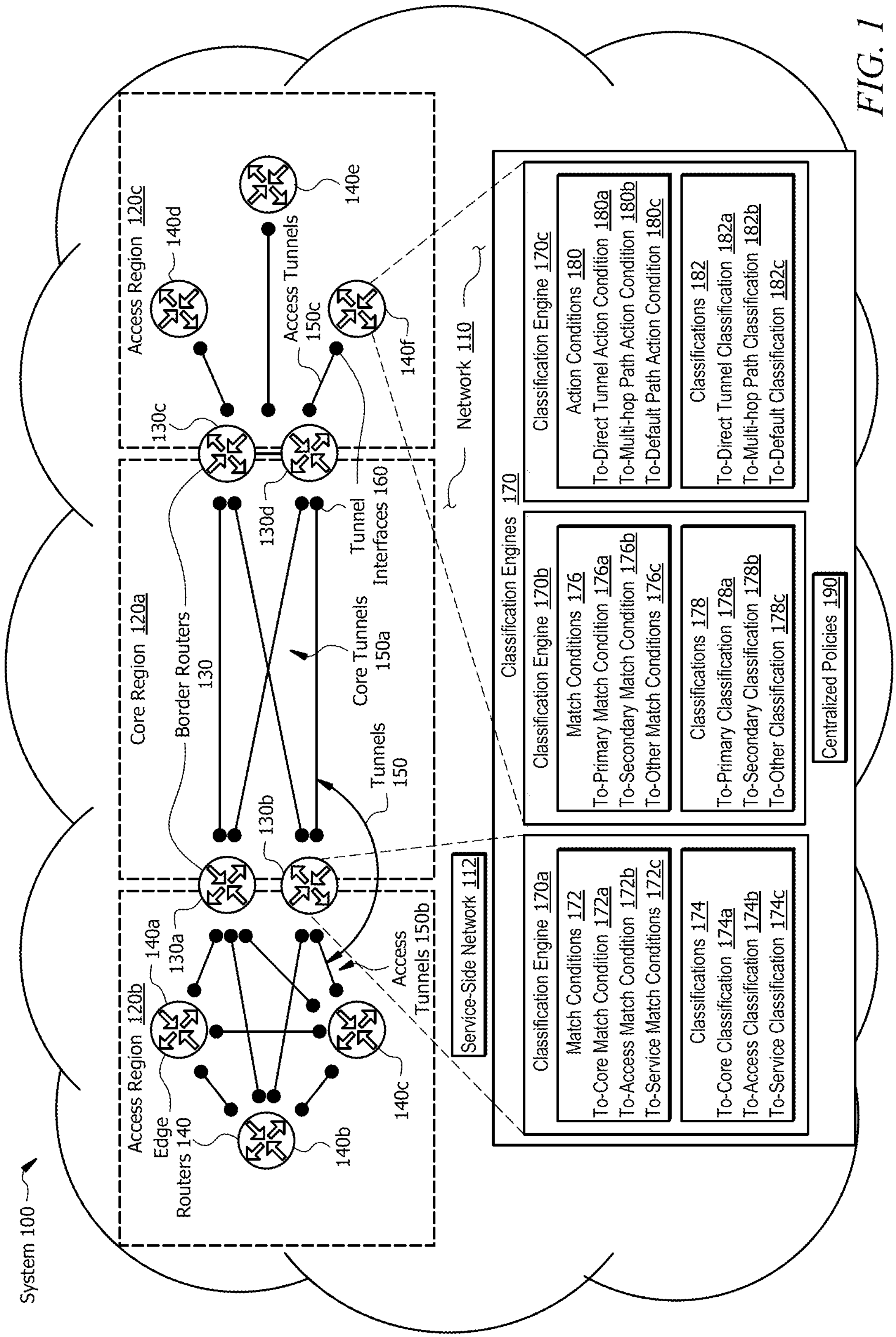
FIG. 1 illustrates a system for classifying traffic in a hierarchical SD-WAN network, in accordance with certain embodiments.

According to an embodiment, a network node includes one or more processors and one or more computer-readable non-transitory storage media coupled to the one or more processors and including instructions that, when executed by the one or more processors, cause the network node to perform operations. The operations include receiving traffic within a hierarchical SD-WAN network. The operations also include determining a destination region of the traffic. The destination region may be within the hierarchical SD-WAN network. The operations further include classifying the traffic based on a match condition. The match condition may be associated with two or more destination regions.

In certain embodiments, the network node is a border router. The two or more destination regions may include a core region, an access region, and a service region. In some embodiments, the match condition matches the traffic to the core region, the access region, or the service region. In some embodiments, the destination region of the traffic is determined based on an Internet Protocol (IP) destination address associated with the traffic.

In certain embodiments, the network node is an edge router. The two or more destination regions may include a primary region, a secondary region, and an other region. In some embodiments, the match condition matches intra-region traffic to the primary region, matches direct-tunnel, inter-region traffic to the secondary region, and matches multi-hop, inter-region traffic to the other region. In certain embodiments, the primary region is a first access region that includes the edge router. In some embodiments, the secondary region is a region that is shared among the edge router of the primary region and an edge router of a second access region such that the secondary region is different from the first access region and the second access region. In certain embodiments, the other region is a region that is outside of the primary region and the secondary region.

In certain embodiments, the operations include classifying the traffic based on an action condition. The action condition may be associated with a direct-tunnel path, a multi-hop path, and an equal-cost multipath (ECMP) path. In some embodiments, the action condition matches the traffic to the direct-tunnel path, the multi-hop path, or the ECMP path. In certain embodiments, the direct-tunnel path is a direct path from a first edge router of a first access region to a second edge router of a second access region. In some embodiments, the multi-hop path is a path from the first edge router of the first access region to a first border router bordering the first access region and a core region, from the first border router to a second border router bordering the core region and the second access region, and from the second border router to the second edge router in the second access region. In certain embodiments, the ECMP path is either the direct-tunnel path or the multi-hop path.

According to another embodiment, a method includes receiving, by a network node, traffic within a hierarchical SD-WAN network. The method also includes determining, by the network node, a destination region of the traffic. The destination region is within the hierarchical SD-WAN network. The method further includes classifying, by the network node, the traffic based on a match condition. The match condition is associated with two or more destination regions.

According to yet another embodiment, one or more computer-readable non-transitory storage media embody instructions that, when executed by a processor, cause the processor to perform operations. The operations include receiving traffic within a hierarchical SD-WAN network. The operations also include determining a destination region of the traffic. The destination region may be within the hierarchical SD-WAN network. The operations further include classifying the traffic based on a match condition. The match condition may be associated with two or more destination regions.

Technical advantages of certain embodiments of this disclosure may include one or more of the following. In certain embodiments, traffic flows are simplified by providing the ability to match traffic that is destined within a core region, an access region, or t a service network using match conditions. In some embodiments, traffic flows are simplified by providing the ability to match traffic that is destined within a primary region, to a secondary region, or outside the primary region using match conditions. In certain embodiments, traffic flows are simplified by providing the ability to match traffic that is destined to a direct path, a multi-hop path, or a default path using action conditions. In certain embodiments, direct tunnels can be selected on specific colors when available for specific traffic. In some embodiments, a direct path may be selected if available at each priority of color preference.

Certain embodiments described herein apply hierarchical SD-WAN, which simplifies policy design. Hierarchical SD-WAN may prevent traffic black holes (routing failure that can occur when a device responsible for one of the hops between the source and destination of a traffic flow is unavailable) caused by policy. Hierarchical SD-WAN may provide end-to-end encryption of inter-region traffic. In certain embodiments, hierarchical SD-WAN provides flexibility to select the best transport for each region. This flexibility can provide for better performance for traffic across geographical regions. Embodiments of this disclosure provide better control over traffic paths between regions. In certain embodiments, hierarchical SD-WAN allows site-to-site traffic paths between disjoint providers (two providers that cannot provide direct IP routing reachability between them).

Certain embodiments described herein use principles of tunneling to encapsulate traffic in another protocol, which enables multiprotocol local networks over a single-protocol backbone. Tunneling may provide workarounds for networks that use protocols that have limited hop counts (e.g., Routing information Protocol (RIP) version 1, AppleTalk, etc.). Tunneling may be used to connect discontiguous subnetworks.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

This disclosure describes systems and methods for classifying traffic in a hierarchical SD-WAN network. In certain embodiments, the hierarchical SD-WAN network includes independent policy domains with different policies that control traffic entering/exiting the different regions of the network. For example, in managed service provider (MSP) deployments, the policy at border routers controlling how the traffic traverses the core region may be controlled by the service provider and may be very different from the policy that is used to traverse one or more access regions.

Since data plane tunnels are a special construct, a policy may be used to control the traffic that utilizes the data plane tunnels. Existing policy constructs based on prefix lists, application lists, and various other packet fields do not provide a simple way to capture the different possible traffic flows. Certain embodiments of this disclosure provide constructs that simplify the traffic control policies.

FIG. 1 illustrates a system 100 for classifying traffic in a hierarchical SD-WAN network, in accordance with certain embodiments. System 100 or portions thereof may be associated with an entity, which may include any entity, such as a business, company, or enterprise, that classifies traffic in a hierarchical SD-WAN. In certain embodiments, the entity may be a service provider that classifies traffic in a hierarchical SD-WAN. The components of system 100 may include any suitable combination of hardware, firmware, and software. For example, the components of system 100 may use one or more elements of the computer system of FIG. 8.

In the illustrated embodiment of FIG. 1, system 100 includes a network 110, a service-side network 112, regions 120 (a core region 120*a*, an access region 120*b*, and an access region 120*c*), border routers 130 (a border router 130*a*, a border router 130*b*, a border router 130*c*, and a border router 130*d*), edge routers 140 (an edge router 140*a*, an edge router 140*b*, an edge router 140*c*, an edge router 140*d*, an edge router 140*e*, an edge router 140*f*, and an edge router 140*g*), tunnels 150 (core tunnels 150*a*, access tunnels 150*b*, and access tunnels 150*c*), tunnel interfaces 160, classification engines 170 (a classification engine 170*a*, a classification engine 170*b*, and a classification engine 170*c*), match conditions 172 (a to-core match condition 172*a*, a to-access match condition 172*b*, and a to-service match condition 172*c*), classifications 174 (a to-core classification 174*a*, a to-access classification 174*b*, and a to-service classification 174*c*), match conditions 176 (a to-primary match condition 176*a*, a to-secondary match condition 176*b*, and a to-other match condition 176*c*), classifications 178 (a to-primary classification 178*a*, a to-secondary classification 178*b*, and a to-other classification 178*c*), action conditions 180 (a to-direct tunnel action condition 180*a*, a to-multi-hop path action condition 180*b*, and a to-default path action condition 180*c*), classifications 182 (a to-direct tunnel classification 182*a*, a to-multi-hop path classification 182*b*, and a to-default classification 182*c*), and centralized policies 190.

Network 110 of system 100 is any type of network that facilitates communication between components of system 100. Network 110 may connect one or more components of system 100. One or more portions of network 110 may include an ad-hoc network, the Internet, an intranet, an extranet, a virtual private network (VPN), an Ethernet VPN (EVPN), a local area network (LAN), a wireless LAN (WLAN), a virtual LAN (VLAN), a WAN, a wireless WAN (WWAN), an SD-WAN, a metropolitan area network (MAN), a portion of the Public Switched Telephone Network (PSTN), a cellular telephone network, a Digital Subscriber Line (DSL), an Multiprotocol Label Switching (MPLS) network, a 3G/4G/5G network, a Long Term Evolution (LTE) network, a cloud network, a combination of two or more of these, or other suitable types of networks. Network 110 may include one or more different types of networks.

Network 110 may be any communications network, such as a private network, a public network, a connection through the Internet, a mobile network, a WI-FI network, etc. Network 110 may include a core network, an access network of a service provider, an Internet service provider (ISP) network, and the like. An access network is the part of the network that provides a user access to a service. A core network is the part of the network that acts like a backbone to connect the different parts of the access network(s). One or more components of system 100 may communicate over network 110. In the illustrated embodiment of FIG. 1, network 110 is a hierarchical SD-WAN. Network 110 includes service-side network 112. Service-side network 112 is a local network such as a LAN that is distinguishable from the transport side of network 110. Service-side network 112 may include one or more service hosts.

Regions 120 (core region 120*a*, access region 120*b*, and access region 120*c*) of system 100 represent distinct networks 110. In certain embodiments, a user defines regions 120 such that different traffic transport services can be used for each region 120. Regions 120 may be associated with different geographical locations and/or data centers. For example, core region 120*a* may be associated with an enterprise's main office located in California, access region 120*b* may be associated with the enterprise's branch office located in Texas, and access region 120*c* may be associated with the enterprise's branch office located in New York. As another example, core region 120*a* may be associated with a data center located in US West, access region 120*b* may be associated with a data center located in US East, and access region 120*c* may be associated with a data center located in Canada West.

In certain embodiments, regions 120 may employ different service providers. For example, core region 120*a* may be associated with a cloud services provider, access region 120*b* may be associated with a West Coast regional service provider, and access region 120*c* may be associated with an East Coast regional service provider.

In some embodiments, core region 120*a* is used to communicate traffic between distinct geographical regions. Core region 120*a* may use a premium transport service to provide a required level of performance and/or cost effectiveness for long-distance connectivity. In certain embodiments, core region 120*a* is a "middle mile" network, which is the segment of a telecommunications network linking a network operator's core network to one or more local networks. The "middle mile" network may include the backhaul network to the nearest aggregation point and/or any other parts of network 110 needed to connect the aggregation point to the nearest point of presence on the operator's core network.

In some embodiments, different network topologies may be used in different regions 120. For example, access region 120*b* may use a full mesh topology of SD-WAN tunnels and access region 120*c* may use a hub-and-spoke topology. In certain embodiments, access regions 120 (e.g., access region 120*b* and access region 120*c*) are "last mile" networks, which are local links used to provide services to end users.

Each region 120 (core region 120*a*, access region 120*b*, and access region 120*c*) of system 100 may include one or more nodes. Nodes are connection points within network 110 that receive, create, store and/or send data along a path. Nodes may include one or more redistribution points that recognize, process, and forward data to other nodes of network 110. Nodes may include virtual and/or physical nodes. For example, nodes may include one or more virtual machines, bare metal servers, and the like. As another example, nodes may include data communications equipment such as computers, routers, servers, printers, workstations, switches, bridges, modems, hubs, and the like. The nodes of network 110 may include one or more border routers 130, edge routers 140, controllers, etc.

Border routers 130 (border router 130*a*, border router 130*b*, border router 130*c*, and border router 130*d*) of system 100 are specialized routers that reside at a boundary of two or more different types of regions 120. In certain embodiments, each border router 130 is an SD-WAN router. Border routers 130 may provide inter-region connectivity by connecting access region 120*b* and access region 120*c* to a common backbone overlay (core region 120*a*). In the illustrated embodiment of FIG. 1, border router 130*a* and border router 130*b* reside at the boundary of core region 120*a* and access region 120*b*, and border router 130*c* and border router 130*d* reside at the boundary of core region 120*a* and access region 120*c*.

In certain embodiments, border routers 130 use static and/or dynamic routing to send data to and/or receive data from different regions 120 of system 100. Border routers 130 may include one or more hardware devices, one or more servers that include routing software, and the like. In certain embodiments, border routers 130 use VPN forwarding tables to route traffic flows between tunnel interfaces 160 that provide connectivity to core region 120*a* and tunnel interfaces 160 that provide connectivity to access region 120*b* and access region 120*c*.

Edge routers 140 (edge router 140*a*, edge router 140*b*, edge router 140*c*, edge router 140*d*, edge router 140*e*, and edge router 1400 of system 100 are specialized routers that reside at an edge of network 110. In certain embodiments, edge routers 140 use static and/or dynamic routing to send data to and/or receive data from one or more networks 110 of system 100. Edge routers 140 may include one or more hardware devices, one or more servers that include routing software, and the like. In the illustrated embodiment of FIG. 1, edge router 140*a*, edge router 140*b*, and edge router 140*c* reside in access region 120*b*, and edge router 140*d*, edge router 140*e*, and edge router 140*f* reside in access region 120*c*. In certain embodiments, border routers 130 and edge routers 140 send data to and/or receive data from other border routers 130 and edge routers 140 via tunnels 150.

Tunnels 150 (core tunnels 150*a*, access tunnels 150*b*, and access tunnels 150*c*) of system 100 are links for communicating data between nodes of system 100. The data plane of system 100 is responsible for moving packets from one location to another. Tunnels 150 provide a way to encapsulate arbitrary packets inside a transport protocol. For example, tunnels 150 may encapsulate data packets from one protocol inside a different protocol and transport the data packets unchanged across a foreign network. Tunnels 150 may use one or more of the following protocols: a passenger protocol (e.g., the protocol that is being encapsulated such as AppleTalk, Connectionless Network Service (CLNS), IP, Internetwork Packet Exchange (IPX), etc.); a carrier protocol (i.e., the protocol that does the encapsulating such as Generic Routing Encapsulation (GRE), IP-in-IP, Layer Two Tunneling Protocol (L2TP), MPLS, Session Traversal Utilities for network address translation (NAT) (STUN), Data Link Switching (DLSw), etc.); a transport protocol (i.e., the protocol used to carry the encapsulated protocol); etc. In some embodiments, the main transport protocol is IP.

In certain embodiments, one or more tunnels 150 are IPSec tunnels. IPSec provides secure tunnels between two peers (e.g., border routers 130 and/or edge routers 140). In some embodiments, a user may define which packets are considered sensitive and should be sent through secure IPSec tunnels 150. The user may also define the parameters to protect these packets by specifying characteristics of IPSec tunnels 150. In certain embodiments, IPSec peers (e.g., border routers 130 and/or edge routers 140) set up secure tunnels 150 and encrypt the packets that traverse tunnels 150 to the remote peer. In some embodiments, one or more tunnels 150 are GRE tunnels. GRE may handle the transportation of multiprotocol and IP multicast traffic between two sites that only have IP unicast connectivity. In certain embodiments, one or more tunnels 150 may use IPSec tunnel mode in conjunction with a GRE tunnel.

In the illustrated embodiment of FIG. 1, core tunnels 150*a* are located in core region 120*a*, access tunnels 150*b* are located in access region 120*b*, and access tunnels 150*c* are located in access region 120*c*. In certain embodiments, core region 120*a* uses a full mesh of core tunnels 150*a* for the overlay topology. For example, each border router 130 in core region 120*a* may have core tunnel 150*a* to each other border router 130 in core region 120*a*. Core tunnels 150*a* may provide optimal connectivity for forwarding traffic from one region 120 to another. In the illustrated embodiment of FIG. 1, core tunnels 150*a* connect border router 130*a* to border router 130*c*, connect border router 130*a* to border router 130*d*, connect border router 130*b* to border router 130*c*, and connect border router 130*b* to border router 130*d*.

Access tunnels 150*b* connect border routers 130 and/or edge routers 140 located on a boundary or edge of access region 120*b*. For example, access tunnels 150*b* may connect border router 130*a* to edge router 140*a*, connect border router 130*a* to edge router 140*b*, and connect border router 130*a* to edge router 140*c*. As another example, access tunnels 150*b* may connect border router 130*b* to edge router 140*a*, connect border router 130*b* to edge router 140*b*, and connect border router 130*b* to edge router 140*c*. As still another example, access tunnels 150*b* may connect edge router 140*a* to edge router 140*b*, connect edge router 140*a* to edge router 140*c*, and connect edge router 140*b* to edge router 140*c*.

Access tunnels 150*c* connect border routers 130 and/or edge routers 140 located on a boundary or edge of access region 120*c*. For example, access tunnels 150*c* may connect border router 130*c* to edge router 140*d*, connect border router 130*c* to edge router 140*e*, and connect border router 130*c* to edge router 140*f* As another example, access tunnels 150*c* may connect border router 130*d* to edge router 140*d*, connect border router 130*d* to edge router 140*e*, and connect border router 130*d* to edge router 140*f*. As still another example, access tunnels 150*c* may connect edge router 140*d* to edge router 140*e*, connect edge router 140*d* to edge router 140*f*, and connect edge router 140*e* to edge router 140*f*.

Tunnels 150 use tunnel interfaces 160 to connect to border routers 130 and edge routers 140. In certain embodiments, each tunnel interface 160 of system 100 is associated with a router port. Tunnel interfaces 160 may be virtual (logical) interfaces that are used to communicate traffic along tunnel 150. In certain embodiments, tunnel interfaces 160 are configured in a transport VPN. In some embodiments, tunnel interfaces 160 come up as soon as they are configured, and they stay up as long as the physical tunnel interface is up.

In some embodiments, tunnel interfaces 160 are not tied to specific "passenger" or "transport" protocols. Rather, tunnel interfaces 160 may be designed to provide the services necessary to implement any standard point-to-point encapsulation scheme. In certain embodiments, tunnel interfaces 160 have either IPv4 or IPv6 addresses assigned. The router (e.g., border router 130 and/or edge router 140) at each end of tunnel 150 may support the IPv4 protocol stack, the IPv6 protocol stack, or both the IPv4 and IPv6 protocol stacks. One or more tunnel interfaces 160 may be configured with a tunnel interface number, an IP address, a defined tunnel destination, and the like. Tunnel interfaces 160 of system 100 may include one or more IP Sec tunnel interfaces, GRE tunnel interfaces, and the like.

In SD-WAN, policies such as data policies and application route policies may classify traffic based on numerous match criteria (e.g., source IP address, destination IP address, destination prefix, port number, differentiated services code point (DSCP) field, protocol, etc.). However, in hierarchical SD-WAN, these options have constraints when classifying overlay traffic on border routers 130. Since border routers 130 are special devices sitting between two separate regions 120, border routers 130 must handle several different traffic paths.

In the illustrated embodiment of FIG. 1, traffic may flow from core region 120*a* to access region 120*b* and access region 120*c*, and from access region 120*b* and access region 120*c* to core region 120*a*. Currently, packets go through two policy enforcement points in border routers 130: (1) from-tunnel; and (2) from-service. However, for border routers 130 and/or edge routers 140 to allow for the various traffic flows and/or to allow for resetting policy actions for inter and intra-region flows, the policy enforcement points may need to be distinguished based on traffic coming from core tunnels 150*a*, access tunnels 150*b*, and access tunnels 150*c*.

In certain embodiments, to steer traffic, the local transport locator (TLOC) (TLOC=tunnel location) and/or remote-TLOC is set to have the desired traffic flow based on the available path options. With a large network, this adds complexity to the traditional matching options and set actions. Policy configuration grows over time as the network grows, and hence the complexity. Certain embodiments of this disclosure include additional points to enforce actions for traffic entering core region 120*a*, access region 120*b*, and access region 120*c*.

Classification engines 170 (classification engine 170*a*, classification engine 170*b*, and classification engine 170*c*) of system 100 are components used by border routers 130 and/or edge routers 140 to classify traffic. In the illustrated embodiment of FIG. 1, classification engine 170*a* is associated with border routers 130 (border router 130*a*, border router 130*b*, border router 130*c*, and border router 130*d*), and classification engine 170*b* and classification engine 170*c* are associated with edge routers 140 (edge router 140*a*, edge router 140*b*, edge router 140*c*, edge router 140*d*, edge router 140*e*, edge router 140*f*, edge router 140*g*).

Classification engine 170*a* associated with border routers 130 uses match conditions 172 to classify traffic into classifications 174. In certain embodiments, match conditions 172 include one or more match statements that define match conditions 172. In the illustrated embodiment of FIG. 1, match conditions 172 include to-core match condition 172*a*, to-access match condition 172*b*, and to-service match condition 172*c*. Classifications 174 include to-core classification 174*a*, to-access classification 142*b*, and to-service classification 172*c*. Classification engine 170*a* uses to-core match condition 172*a* to match traffic to to-core classification 174*a*, classification engine 170*a* uses to-access match condition 172*b* to match traffic to to-access classification 174*b*, and classification engine 170*a* uses to-service match condition 172*c* to match traffic to to-service classification 174*c*.

Figure 2:
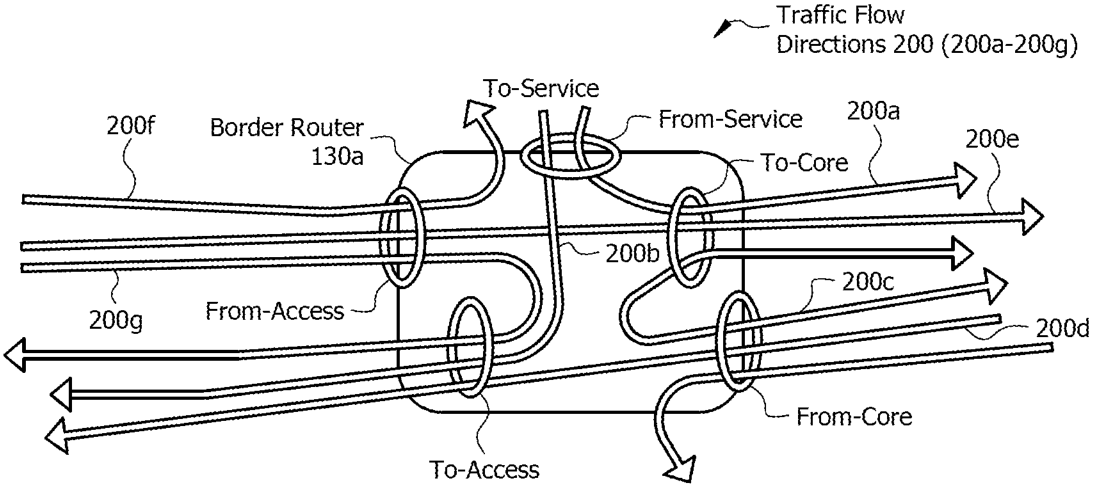
FIG. 2 illustrates different possible traffic flow directions on a border router in a hierarchical SD-WAN environment, in accordance with certain embodiments.

If classification engine 170*a* of system 100 determines that incoming traffic on border router 130 (e.g., border router 130*a*, border router 130*b*, border router 130*c*, or border router 130*d*) is destined for core region 120*a* based on to-core match condition 172*a*, classification engine 170*a* matches the traffic to to-core classification 174*a*. If classification engine 270*a* of system 100 determines that incoming traffic on border router 130 (e.g., border router 130*a*, border router 130*b*, border router 130*c*, or border router 130*d*) is destined for access region 120*b* based on to-access match condition 172*b*, classification engine 270*a* matches the traffic to to-access classification 174*b*. If classification engine 270*a* of system 100 determines that incoming traffic on border router 130 (e.g., border router 130*a*, border router 130*b*, border router 130*c*, or border router 130*d*) is destined for service-side network 112 based on to-service match condition 172*c*, classification engine 270*a* matches the traffic to to-service classification 174*c*. The traffic flow directions associated with match conditions 172 are illustrated in FIG. 2.

Classification engine 170*b* associated with edge routers 140 uses match conditions 176 to classify traffic into classifications 178. In certain embodiments, match conditions 176 include one or more match statements that define match conditions 176. In the illustrated embodiment of FIG. 1, match conditions 176 include to-primary match condition 176*a*, to-secondary region match condition 176*b*, and to-other match condition 176*c*. Classifications 178 include to-primary classification 178*a*, to-secondary condition 178*b*, and to-other classification 178*c*.

The primary region (e.g., primary region 320*a* of FIG. 3) represents the access region (access region 120*b* or access region 120*c*) that edge router 140 is part of In the illustrated embodiment of FIG. 1, the primary region for edge router 140*a*, edge router 140*b*, and edge router 140*c* is access region 120*b*, and the primary region for edge router 140*d*, edge router 140*e*, and edge router 140*f* is access region 120*c*. The secondary region (e.g., secondary region 320*b* of FIG. 3) is a region that is shared among edge routers 140 and is different from their respective primary regions. For example, a region having a direct tunnel connecting edge router 140*a* of access region 120*b* to edge router 140*d* of access region 120*c* is considered a secondary region. The other region (e.g., other region 320*c* of FIG. 3) is a region that is outside of the primary region and the secondary region. For example, in the illustrated embodiment of FIG. 1, the other region may be core region 120*a*.

Figure 3:
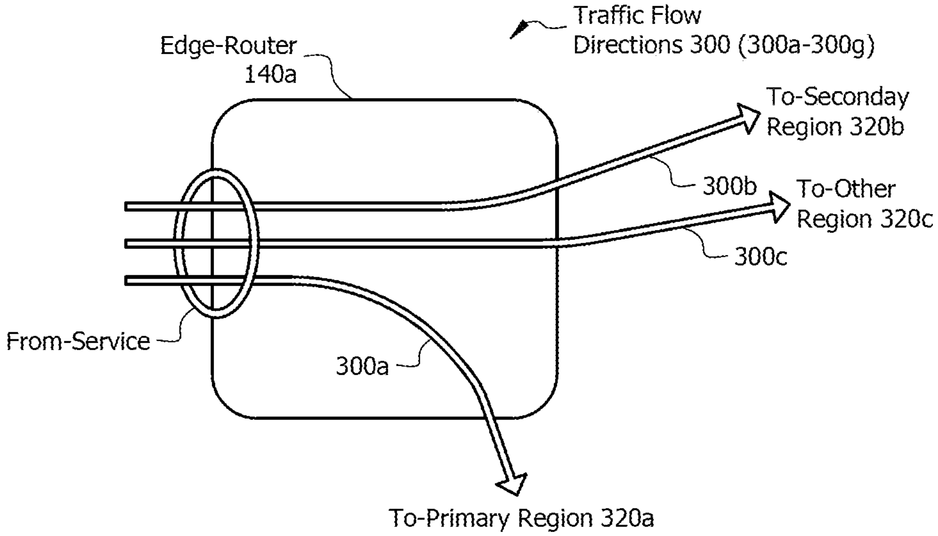
FIG. 3 illustrates different traffic flow directions on an edge router in a hierarchical SD-WAN environment, in accordance with certain embodiments.

If classification engine 170*b* of system 100 determines that incoming traffic on edge router 140 (edge router 140*a*, edge router 140*b*, edge router 140*c*, edge router 140*d*, edge router 140*e*, or edge router 1400 is destined for a primary region based on to-primary match condition 176*a*, classification engine 170*a* matches the traffic to to-primary classification 178*a*. If classification engine 170*b* of system 100 determines that incoming traffic on edge router 140 (edge router 140*a*, edge router 140*b*, edge router 140*c*, edge router 140*d*, edge router 140*e*, or edge router 1400 is destined for a secondary region based on to-secondary region match condition 176*b*, classification engine 170*b* matches the traffic to to-secondary classification 178*b*. If classification engine 170*b* of system 100 determines that incoming traffic on edge router 140 (edge router 140*a*, edge router 140*b*, edge router 140*c*, edge router 140*d*, edge router 140*e*, or edge router 1400 is destined for the other region based on to-other match condition 176*c*, classification engine 270*a* matches the traffic to to-other classification 178*c*. The traffic flow directions associated with match conditions 176 are illustrated in FIG. 3.

Classification engine 170*c* associated with edge routers 140 uses action conditions 180 to classify traffic into classifications 182. In certain embodiments, action conditions 180 include one or more action statements that define action conditions 180. In the illustrated embodiment of FIG. 1, action conditions 180 include to-direct tunnel action condition 182*a*, to-multi-hop path action condition 180*b*, and a to-default path action condition 180*c*. Classifications 182 include to-direct tunnel classification 182*a*, to-multi-hop path condition 182*b*, and to-default classification 182*c*.

To-direct tunnel classification 182*a* instructs edge router 140 (edge router 140*a*, edge router 140*b*, or edge router 140*c*) of access region 120*b* to form a direct session (e.g., a direct Bidirectional Forwarding Detection (BFD) session) with another edge router 140 (edge router 140*d*, edge router 140*e*, or edge router 1400 in access region 120*c*. In certain embodiments, direct tunnels are selected on specific colors when available for specific traffic. Colors are SD-WAN software constructs that identify transport tunnels. In certain embodiments, colors are statically defined keywords that identify individual transports as either public or private. For example, the colors metro-ethernet, mpls, and private1private2, private3, private4, private5, and private6 may be considered private colors that are intended to be used for private networks or in places with no NAT addressing of the transport IP endpoints. As another example, colors 3g, biz-internet, blue, bronze, custom1, custom2, custom3, default, gold, green, lte, public-internet, red, and silver may be considered public colors that are intended to be used for public networks or in places that use public IP addressing of the transport IP endpoints (either natively or through NAT). Color may dictate the use of either private IP or public IP address when communicating through the control or data plane. In some embodiments, a direct tunnel may be selected if available at each priority of color preference.

To-multi-hop path classification 182*b* instructs edge router 140 (edge router 140*a*, edge router 140*b*, or edge router 140*c*) of access region 120*b* to select a path that includes multiple hops. For example, to-multi-hop path classification 182*b* may instruct edge router 140 to take a hierarchical path (e.g., hierarchical path 560 of FIG. 5) between edge routers 140 in different regions 120. A hierarchical path is a route that includes multiple hops from access region 120*b* to access region 120*c* through core region 120*a*.

To-default classification 182*c* instructs edge router 140 to select a default path such as a best path or an ECMP path. For example, to-default classification 182*c* may instruct edge router 140 to select the best path between one or more hierarchical paths and one or more direct paths.

If classification engine 170*c* of system 100 determines that incoming traffic on edge router 140 (edge router 140*a*, edge router 140*b*, edge router 140*c*, edge router 140*d*, edge router 140*e*, or edge router 1400 is destined for a direct tunnel (e.g., direct tunnel 550 of FIG. 5) based on to-direct tunnel action condition 180*a*, classification engine 170*c* matches the traffic to to-direct tunnel classification 182*a*. If classification engine 170*c* of system 100 determines that incoming traffic on edge router 140 (edge router 140*a*, edge router 140*b*, edge router 140*c*, edge router 140*d*, edge router 140*e*, or edge router 1400 is destined for a multi-hop path (e.g., hierarchical path 560 of FIG. 5) based on to-multi-hop path action condition 180*b*, classification engine 170*c* matches the traffic to to-multi-hop path classification 182*b*. If classification engine 170*c* of system 100 determines that incoming traffic on edge router 140 (edge router 140*a*, edge router 140*b*, edge router 140*c*, edge router 140*d*, edge router 140*e*, or edge router 1400 is destined for a default path (e.g., an ECMP path) based on to-default path action condition 182*c*, classification engine 270*a* matches the traffic to to-default classification 182*c*. The traffic flow directions associated with action conditions 180 are illustrated in FIG. 3.

In certain embodiments, border routers 130 and/or edge routers 140 apply centralized policies 190 based on destination match criterions. For example, border routers 130 may apply centralized polices based on match conditions 172 (to-core match condition 172*a*, to-access match condition 172_b_, and to-service match condition 172_c_). As another example, edge routers 140 may apply centralized polices 190 based on match conditions 176 (to-primary match condition 176_a_, to-secondary match condition 176_b_, and to-other match condition 176_c_). In some embodiments, edge routers 140 apply centralized policies 190 based on action criterions. For example, edge routers 140 may apply centralized polices 190 based on action conditions 180 (to-direct tunnel action condition 180_a_, to-multi-hop path match condition 180_b_, and to-default path action condition 180_c_).

Policies 190 of system 100 are sets of rules that govern the behaviors of components in network 110. For example, border routers 130 and/or edge routers 140 of network 110 may use one or more policies 190. Policies 190 may be associated with one or more match conditions 172, match conditions 176, action conditions 180, SLAs, QoSs, colors, and the like. Policies 190 may be used to apply appropriate actions for traffic destined to core region 120_a_, access region 120_b_, and/or access region 120_c_. In some embodiments, match conditions 172, match conditions 176, and/or action conditions 180 are used with other match conditions 172, match conditions 176, and/or action conditions 180 to create complex policies 190 that influence inter-region and/or intra-region traffic.

In operation, border router 130_a_ or edge router 140_a_ receives traffic within hierarchical SD-WAN network 110 and determines destination region 120 (e.g., core region 120_a_, access region 120_b_, or access region 120_b_) of the traffic based on an IP destination address associated with the traffic. Classification engine 170 (e.g., classification engine 170_a_, classification engine 170_b_, or classification engine 170_c_) of border router 130_a_ or edge router 140_a_ then classifies the traffic based on match conditions 172, match conditions 176, or action conditions 180. For example, if classification engine 170_a_ determines that destination region 120 is associated with core region 120_a_, access regions 120_b_ or 120_c_, or service-side network 112 based on to-core match condition 172_a_, to-access match condition 172_b_, or to-service match condition 172_c_, respectively, classification engine 170_a_ classifies the traffic into to-core classification 174_a_, to-access classification 174_b_, or to-service classification 174_c_, respectively. As another example, if classification engine 170_b_ determines that destination region 120 is associated with a primary region, a secondary region, or an other region based on to-primary match condition 176_a_, to-secondary match condition 176_b_, or to-other match condition 176_c_, respectively, classification engine 170_b_ classifies the traffic into to-primary classification 178_a_, to-secondary classification 178_b_, or to-other classification 178_c_, respectively. As still another example, if classification engine 170_c_ determines that destination region 120 is associated with a direct tunnel path, a multi-hop path, or a default (e.g., ECMP) path based on to-direct tunnel action condition 180_a_, to-multi-hop path action condition 180_b_, or to-default path action condition 180_c_, respectively, classification engine 170_c_ classifies the traffic into to-direct tunnel classification 182_a_, to-multi-hop path classification 182_b_, or to-default classification 182_c_, respectively. As such, border routers 130 and edge routers 140_a_ of system 100 have the ability to match and take action on traffic based on various paths, which greatly simplifies the policy language in a hierarchical SD-WAN network.

Although FIG. 1 illustrates a particular number of networks 110, service-side networks 112, regions 120 (core region 120_a_, access region 120_b_, and access region 120_c_), border routers 130 (border router 130_a_, border router 130_b_, border router 130_c_, and border router 130_d_), edge routers 140 (edge router 140_a_, edge router 140_b_, edge router 140_c_, edge router 140_d_, edge router 140_e_, edge router 140_f_, and edge router 140_g_), tunnels 150 (core tunnels 150_a_, access tunnels 150_b_, and access tunnels 150_c_), tunnel interfaces 160, classification engines 170 (classification engine 170_a_, classification engine 170_b_, and classification engine 170_c_), match conditions 172 (to-core match condition 172_a_, to-access match condition 172_b_, and to-service match condition 172_c_), classifications 174 (to-core classification 174_a_, to-access classification 174_b_, and to-service classification 174_c_), match conditions 176 (to-primary match condition 176_a_, to-secondary match condition 176_b_, and to-other match condition 176_c_), classifications 178 (to-primary classification 178_a_, to-secondary classification 178_b_, and to-other classification 178_c_), action conditions 180 (to-direct tunnel action condition 180_a_, to-multi-hop path action condition 180_b_, and to-default path action condition 180_c_), classifications 182 (to-direct tunnel classification 182_a_, to-multi-hop path classification 182_b_, and to-default classification 182_c_), and centralized policies 190, this disclosure contemplates any suitable number of networks 110, service-side networks 112, regions 120, border routers 130, edge routers 140, tunnels 150, tunnel interfaces 160, classification engines 170, match conditions 172, classifications 174, match conditions 176, classifications 178, action conditions 180, classifications 182, and centralized policies 190. For example, system 100 may include more or less than three regions 120. As another example, core region 120_a_ may include more or less than four border routers 130.

Although FIG. 1 illustrates a particular arrangement of network 110, service-side network 112, regions 120 (core region 120_a_, access region 120_b_, and access region 120_c_), border routers 130 (border router 130_a_, border router 130_b_, border router 130_c_, and border router 130_d_), edge routers 140 (edge router 140_a_, edge router 140_b_, edge router 140_c_, edge router 140_d_, edge router 140_e_, edge router 140_f_, and edge router 140_g_), tunnels 150 (core tunnels 150_a_, access tunnels 150_b_, and access tunnels 150_c_), tunnel interfaces 160, classification engines 170 (classification engine 170_a_, classification engine 170_b_, and classification engine 170_c_), match conditions 172 (to-core match condition 172_a_, to-access match condition 172_b_, and to-service match condition 172_c_), classifications 174 (to-core classification 174_a_, to-access classification 174_b_, and to-service classification 174_c_), match conditions 176 (to-primary match condition 176_a_, to-secondary match condition 176_b_, and to-other match condition 176_c_), classifications 178 (to-primary classification 178_a_, to-secondary classification 178_b_, and to-other classification 178_c_), action conditions 180 (to-direct tunnel action condition 180_a_, to-multi-hop path action condition 180_b_, and to-default path action condition 180_c_), classifications 182 (to-direct tunnel classification 182_a_, to-multi-hop path classification 182_b_, and to-default classification 182_c_), and centralized policies 190, this disclosure contemplates any suitable arrangement of network 110, service-side network 112, regions 120, border routers 130, edge routers 140, tunnels 150, tunnel interfaces 160, classification engines 170, match conditions 172, classifications 174, match conditions 176, classifications 178, action conditions 180, classifications 182, and centralized policies 190.

Furthermore, although FIG. 1 describes and illustrates particular components, devices, or systems carrying out particular actions, this disclosure contemplates any suitable combination of any suitable components, devices, or systems carrying out any suitable actions.

FIG. 2 illustrates different possible traffic flow directions 200 (traffic flow direction 200_a_, traffic flow direction 200_b_, traffic flow direction 200c, traffic flow direction 200d, traffic flow direction 200e, traffic flow direction 200f, and traffic flow direction 200g) on border router 130a of FIG. 1 in a hierarchical SD-WAN environment, in accordance with certain embodiments.

Traffic flow direction 200a includes traffic flowing from service-side network 112 of FIG. 1 to core region 120a of FIG. 1. In certain embodiments, incoming traffic having traffic flow direction 200a is matched with “to-core” traffic. For example, referring to FIG. 1, classification engine 170a of border router 130a may match incoming traffic having traffic flow direction 200a with to-core classification 174a based on to-core match condition 172a.

Traffic flow direction 200b includes traffic flowing from service-side network 112 of FIG. 1 to access region 120b of FIG. 1. In certain embodiments, incoming traffic having traffic flow direction 200b is matched with “to-access” traffic. For example, referring to FIG. 1, classification engine 170a of border router 130a may match incoming traffic having traffic flow direction 200b with to-access classification 174b based on to-access match condition 172b.

Traffic flow direction 200c includes traffic flowing from core region 120a of FIG. 1 back to core region 120a of FIG. 1. In certain embodiments, incoming traffic having traffic flow direction 200c is matched with “to-core” traffic. For example, referring to FIG. 1, classification engine 170a of border router 130a may match incoming traffic having traffic flow direction 200c with to-core classification 174a based on to-core match condition 172a.

Traffic flow direction 200d includes traffic flowing from core region 120a of FIG. 1 to access region 120b of FIG. 1. In certain embodiments, incoming traffic having traffic flow direction 200d is matched with “to-access” traffic. For example, referring to FIG. 1, classification engine 170a of border router 130a may match incoming traffic having traffic flow direction 200d with to-access classification 174b based on to-access match condition 172b.

Traffic flow direction 200e includes traffic flowing from access region 120b of FIG. 1 to core region 120a of FIG. 1. In certain embodiments, incoming traffic having traffic flow direction 200e is matched with “to-core” traffic. For example, referring to FIG. 1, classification engine 170a of border router 130a may match incoming traffic having traffic flow direction 200e with to-core classification 174a based on to-core match condition 172a.

Traffic flow direction 200f includes traffic flowing from access region 120b of FIG. 1 to service-side network 112 of FIG. 1. In certain embodiments, incoming traffic having traffic flow direction 200f is matched with “to-service” traffic. For example, referring to FIG. 1, classification engine 170a of border router 130a may match incoming traffic having traffic flow direction 200f with to-service classification 174c based on to-service match condition 172c.

Traffic flow direction 200g includes traffic flowing from access region 120b of FIG. 1 back to access region 120b of FIG. 1. In certain embodiments, incoming traffic having traffic flow direction 200g is matched with “to-access” traffic. For example, referring to FIG. 1, classification engine 170a of border router 130a may match incoming traffic having traffic flow direction 200g with to-access classification 174b based on to-access match condition 172b. As such, border router 130a has the ability to match traffic to a core, access, or service path, which greatly simplifies the policy language in a hierarchical SD-WAN network.

Although FIG. 2 illustrates a particular number of border routers 130 (border router 130a) and traffic flow directions 200 (traffic flow direction 200a, traffic flow direction 200b, traffic flow direction 200c, traffic flow direction 200d, traffic flow direction 200e, traffic flow direction 200f, and traffic flow direction 200g), this disclosure contemplates any suitable number of border routers 130 and flow directions 200.

Although FIG. 2 illustrates a particular arrangement of border router 130a and traffic flow directions 200 (traffic flow direction 200a, traffic flow direction 200b, traffic flow direction 200c, traffic flow direction 200d, traffic flow direction 200e, traffic flow direction 200f, and traffic flow direction 200g), this disclosure contemplates any suitable arrangement of border router 130a and traffic flow directions 200.

Furthermore, although FIG. 2 describes and illustrates particular components, devices, or systems carrying out particular actions, this disclosure contemplates any suitable combination of any suitable components, devices, or systems carrying out any suitable actions.

FIG. 3 illustrates different traffic flow directions 300 (traffic flow direction 300a, traffic flow direction 300b, and traffic flow direction 300c) on edge router 140a of FIG. 1 in a hierarchical SD-WAN environment, in accordance with certain embodiments. When traffic arrives at edge router 140a, edge router 140a may use the destination IP address of the traffic to determine whether the destination is in the same region (primary region), the destination is reachable over a direct tunnel (secondary-region), or the destination is reachable only by traversing the core region (other regions). The following construct may be used to capture traffic that is destined to different regions as a match condition: match destination-region <primary-region/secondary-region/other-region>. This construct allows for traffic to be classified by the destination region, which allows different actions such as QoS and SLAs to be applied to these aggregates. Once this traffic is classified, as an action, flows may be sent selectively via a direct tunnel or through a multi-hop-path traversing the core. Accordingly, the notion of path-preference is introduced to prefer one of the many paths available or all of them: path-preference <all-paths/direct-path/multi-hop-path>.

Traffic flow direction 300a includes traffic flowing from service-side network 112 of FIG. 1 to primary region 320a. In the illustrated embodiment of FIG. 1, primary region 320a is access region 120b (the region in which edge router 140a resides). In certain embodiments, incoming traffic having traffic flow direction 300a is matched with “to-primary region” traffic. For example, referring to FIG. 1, classification engine 170b of edge router 140a may match incoming traffic having traffic flow direction 300a with to-primary classification 178a based on to-primary match condition 176a.

Traffic flow direction 300b includes traffic flowing from service-side network 112 of FIG. 1 to secondary region 320b. In the illustrated embodiment of FIG. 1, the secondary region may be a direct tunnel connecting edge router 140a of access region 120b and edge router 140d of access region 120c. In certain embodiments, incoming traffic having traffic flow direction 300b is matched with “to-secondary region” traffic. For example, referring to FIG. 1, classification engine 170b of edge router 140a may match incoming traffic having traffic flow direction 300b with to-secondary classification 178b based on to-secondary region match condition 176b.

Traffic flow direction 300c includes traffic flowing from service-side network 112 of FIG. 1 to other region 320c. In the illustrated embodiment of FIG. 1, the other region may be core region 120a. In certain embodiments, incoming traffic having traffic flow direction 300c is matched with “to-other region” traffic. For example, referring to FIG. 1, classification engine 170*b* of edge router 140*a* may match incoming traffic having traffic flow direction 300*c* to-other classification 178*c* based on to-other region match condition 176*c*. As such, edge router 140*a* has the ability to match traffic to a primary, secondary, or other region, which greatly simplifies the policy language in a hierarchical SD-WAN network.

Although FIG. 3 illustrates a particular number of edge routers 140 (edge router 140*a*) and traffic flow directions 300 (traffic flow direction 300*a*, traffic flow direction 300*b*, traffic flow direction 300*c*), this disclosure contemplates any suitable number of edge routers 140 and traffic flow directions 300.

Although FIG. 3 illustrates a particular arrangement of edge router 140*a* and traffic flow directions 300 (traffic flow direction 300*a*, traffic flow direction 300*b*, traffic flow direction 300*c*), this disclosure contemplates any suitable arrangement of edge router 140*a* and traffic flow directions 300.

Furthermore, although FIG. 3 describes and illustrates particular components, devices, or systems carrying out particular actions, this disclosure contemplates any suitable combination of any suitable components, devices, or systems carrying out any suitable actions.

Figure 4:
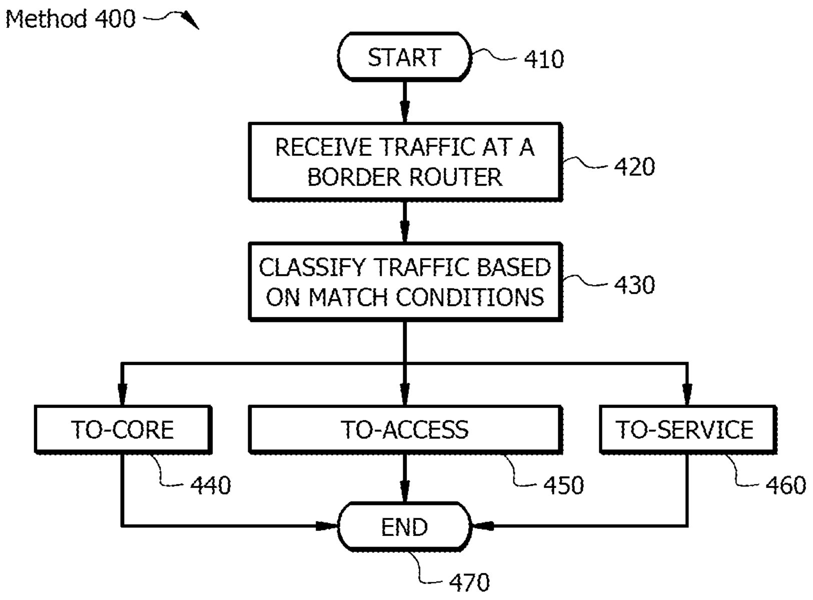
FIG. 4 illustrates a method for classifying traffic on a border router based on match conditions, in accordance with certain embodiments.

FIG. 4 illustrates an example method 400 for classifying traffic on a border router based on match conditions. Method 400 begins at step 410. At step 420 of method 400, a border router receives traffic flows from tunnels and the service side of the border router. For example, referring to FIG. 2, border router 130*a* may receive traffic flows 200*a* through 200*g* from service network 112, core region 120*a*, and access region 120*b* of FIG. 1. These traffic flows egress to either the core network, to access networks, or to the service network. For example, referring to FIG. 1, these traffic flows may egress to service-side network 112, core region 120*a*, access region 120*b*, or access region 120*c*. Once the border router receives the incoming traffic, method 400 moves from step 420 to step 430.

At step 430 of method 400, the border router classifies the traffic based on match conditions. For example, referring to FIG. 1, classification engine 170*a* of border router 130*a* may classify incoming traffic based on match conditions 172 (to-core match condition 172*a*, to-access match condition 172*b*, and to-service match condition 172*c*). Accordingly, the policy construct of method 400 captures traffic that is destined to these various networks as a match condition in policy: match traffic to <access/core/service>. This construct allows the border router to classify traffic going to the core, access, and/or service networks such that separate actions (e.g., Quality of Service (QoS), service level agreement (SLA), etc.) may be applied to each aggregate. While this action has more relevance at the border routers since the border routers have interfaces to the core, access, and service networks, these match conditions may be applied to the edge routers as well, with traffic to the access and service networks having more relevance.

If, at step 430, the border router determines that the destination region is a core region, method 400 moves to step 440, where the border router classifies the traffic as "to-core" traffic. If, at step 430, the border router determines that the destination region is an access region, method 400 moves to step 450, where the border router classifies the traffic as "to-access" traffic. If, at step 430, the border router determines that the destination region is a service-side network, method 400 moves to step 440, where the border router classifies the traffic as "to-service" traffic. Method 400 then moves from step 440, step 450, and step 460 to step 470, where method 400 ends. As such, method 400 has the ability to match traffic to a core region, an access region, or a service network, which greatly simplifies the policy language in a hierarchical SD-WAN network.

Although this disclosure describes and illustrates particular steps of method 400 of FIG. 4 as occurring in a particular order, this disclosure contemplates any suitable steps of method 400 of FIG. 4 occurring in any suitable order. Although this disclosure describes and illustrates an example method 400 for classifying traffic on a border router based on match conditions including the particular steps of the method of FIG. 4, this disclosure contemplates any suitable method for classifying traffic on a border router based on match conditions, which may include all, some, or none of the steps of the method of FIG. 4, where appropriate. Although FIG. 4 describes and illustrates particular components, devices, or systems carrying out particular actions, this disclosure contemplates any suitable combination of any suitable components, devices, or systems carrying out any suitable actions.

Figure 5:
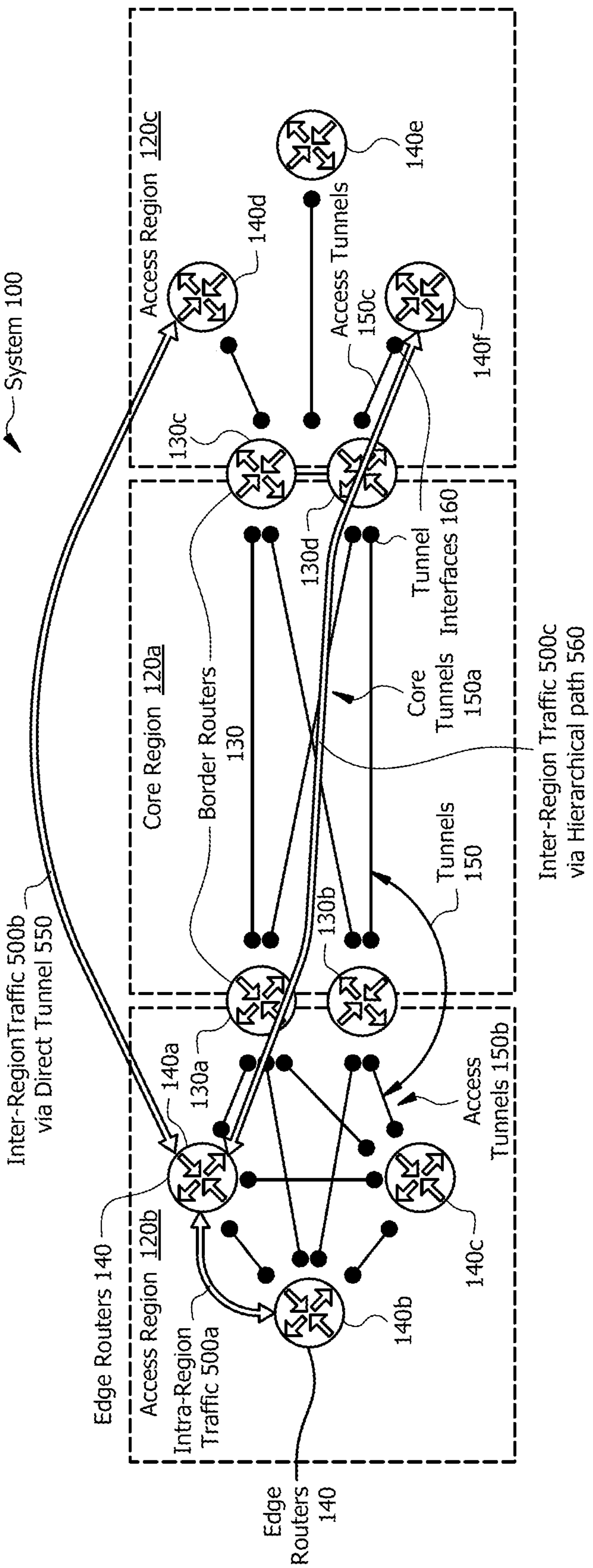
FIG. 5 illustrates different types of traffic that may be used by the system of FIG. 1, in accordance with certain embodiments.

FIG. 5 illustrates different types of traffic 500 (intra-region traffic 500*a*, inter-region traffic 500*b* via a direct tunnel construct, and inter-region traffic 500*c* via a hierarchical path) that may be used by system 100 of FIG. 1, in accordance with certain embodiments. In the illustrated embodiment of FIG. 5, different types of traffic 500 include intra-region traffic 500*a*, inter-region traffic 500*b* via a direct tunnel 550, and inter-region traffic 500*c* via a hierarchical path 560.

Intra-region traffic 500*a* of system 100 is traffic that flows within the same region 120. For example, as illustrated in FIG. 5, intra-region traffic 500*a* may flow across access tunnels 150*b* between edge router 140*a* and edge router 140*b* of access region 120*b*. As another example, intra-region traffic 500*a* may flow across access tunnels 150*b* between edge router 140*b* and edge router 140*c* of access region 120*b*. As still another example, intra-region traffic 500*a* may flow across access tunnels 150*c* between edge router 140*d* and edge router 140*e* of access region 120*c*.

Inter-region traffic 500*b* is traffic that flows via direct tunnel 550 between edge routers 140 in different regions 120. For example, as illustrated in FIG. 5, inter-region traffic 500*b* may flow across direct tunnel 550 between edge router 140*a* of access region 120*b* and edge router 140*d* of access region 120*b*. Direct tunnel 550 is any tunnel that forms a direct path from one edge router 140 to another edge router 140. The direct-tunnel feature in hierarchical SD-WAN allows edge router 140 (edge router 140*a*, edge router 140*b*, or edge router 140*c*) of access region 120*b* to form a direct session (e.g., a direct BFD session) with another edge router 140 (edge router 140*d*, edge router 140*e*, or edge router 1400 in access region 120*c*.

Direct tunnel 550 makes edge router 140*a* part of two different regions at a time: (1) primary region (access region 120*b* that edge router 140*a* is part of); and (2) secondary region (a region that is shared among edge router 140*a* and edge router 140*d* and is different from their respective primary regions 120). In certain embodiments, the secondary region is used by both edge router 140*a* and edge router 140*d* to form direct tunnel 550 with each other. In certain embodiments, direct tunnels 550 are selected on specific colors when available for specific traffic. For example, direct tunnel 550 may be selected from all available direct tunnels 550 at each priority of color preference.

Inter-region traffic 500*c* is traffic that flows via a hierarchical path 560 between edge routers 140 in different regions 120. Hierarchical path 560 is a route that includes multiple hops from access region 120*b* to access region 120*c* through core region 120*a*. For example, referring to FIG. 5, inter-region traffic 500*c* flows along hierarchical path 560 from edge router 140*a* of access region 120*b* to border router 130*a*, from border router 130*a* to border router 130*d* through core region 120*a*, and from border router 130*d* to edge router 140*f* through access region 120*c*.

Although FIG. 5 illustrates a particular number of paths for intra-region traffic 500*a*, direct tunnels 550 for inter-region traffic 500*b*, and hierarchical paths 560 for inter-region traffic 500*c*, this disclosure contemplates any suitable number of paths for intra-region traffic 500*a*, direct tunnels 550 for inter-region traffic 500*b*, and hierarchical paths 560 for inter-region traffic 500*c*.

Although FIG. 5 illustrates a particular arrangement of a path for intra-region traffic 500*a*, direct tunnel 550 for inter-region traffic 500*b*, and hierarchical path 560 for inter-region traffic 500*c*, this disclosure contemplates any suitable arrangement of path for intra-region traffic 500*a*, direct tunnel 550 for inter-region traffic 500*b*, and hierarchical path 560 for inter-region traffic 500*c*.

Furthermore, although FIG. 5 describes and illustrates particular components, devices, or systems carrying out particular actions, this disclosure contemplates any suitable combination of any suitable components, devices, or systems carrying out any suitable actions.

Figure 6:
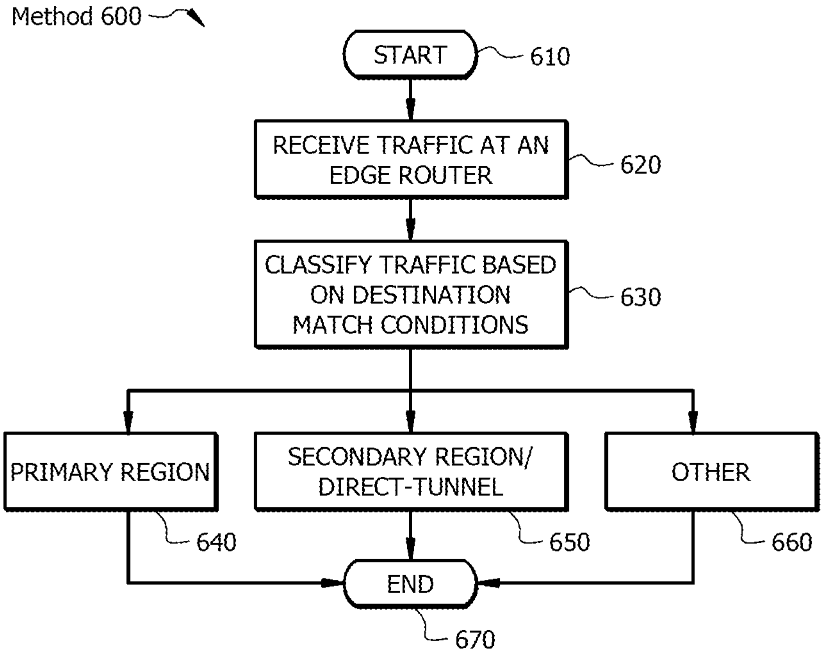
FIG. 6 illustrates a method for classifying traffic on an edge router based on match conditions, in accordance with certain embodiments.

FIG. 6 illustrates an example method 600 for classifying traffic on an edge router based on match conditions. Method 600 of FIG. 6 introduces a match option and an action based on path-preference. Traffic is matched based on whether the traffic is destined within a primary region (intra-region traffic), to a secondary region (inter-region traffic via direct tunnel), or outside the primary region (inter-region traffic but not to the secondary region).

Method 600 begins at step 610. At step 620 of method 600, an edge router receives traffic from the service-side of the edge router. For example, referring to FIG. 1, edge router 140*a* may receive traffic from service-side network 112. These traffic flows egress to either a primary region, a secondary region, or an other region. For example, referring to FIG. 3, these traffic flows egress to either to primary region 320*a*, to secondary region 320*b*, or to other region 320*c*. Once the edge router receives the incoming traffic, method 600 moves from step 620 to step 630.

At step 630 of method 600, the edge router classifies the traffic based on match conditions. For example, referring to FIG. 1, classification engine 170*b* of edge router 140*a* may classify incoming traffic based on match conditions 176 (to-primary match condition 176*a*, to-secondary region match condition 176*b*, and to-other match condition 176*c*). In certain embodiments, when traffic arrives at the edge router, the edge router uses the destination IP address to determine if the destination is in the same region (primary region), is reachable over the direct tunnel (secondary region), or is reachable only by traversing the core region (other regions). The policy construct of method 600 captures traffic that is destined to these various networks as a match condition in policy: match traffic to <primary/secondary/other>. This construct allows the edge router to classify traffic going to the primary, secondary, or other networks such that separate actions (e.g., QoS, SLA, etc.) may be applied to each aggregate.

If, at step 630, the edge router determines that the destination region is a primary region, method 600 moves to step 640, where the edge router classifies the traffic as "to-primary region" traffic. For example, referring to FIGS. 1 and 3, classification engine 170*b* of edge router 140*a* may match incoming traffic having traffic flow direction 300*a* with to-primary classification 178*a* based on to-primary match condition 176*a*.

If, at step 630, the edge router determines that the destination region is a secondary region, method 600 moves to step 650, where the edge router classifies the traffic as "to-secondary region" traffic. For example, referring to FIGS. 1 and 3, classification engine 170*b* of edge router 140*a* may match incoming traffic having traffic flow direction 300*b* with to-secondary classification 178*b* based on to-secondary region match condition 176*b*.

If, at step 630, the edge router determines that the destination region is the other region, method 600 moves to step 660, where the edge router classifies the traffic as "to-other region" traffic. For example, referring to FIGS. 1 and 3, classification engine 170*b* of edge router 140*a* may match incoming traffic having traffic flow direction 300*b* with to-other classification 178*c* based on to-other region match condition 176*c*.

In certain embodiments, 'traffic-to' can be set by the edge router as: (1) 'primary', which matches all traffic going towards the primary region; (2) 'secondary', which matches all traffic going towards the secondary region; and (3) 'other', which matches all the traffic going towards the other region. Method 600 then moves from step 640, step 650, and step 660 to step 670, where method 600 ends. As such, method 600 has the ability to match traffic to a primary region, a secondary region, or an other region, which greatly simplifies the policy language in a hierarchical SD-WAN network.

Although this disclosure describes and illustrates particular steps of method 600 of FIG. 6 as occurring in a particular order, this disclosure contemplates any suitable steps of method 600 of FIG. 6 occurring in any suitable order.

Although this disclosure describes and illustrates an example method 600 for classifying traffic on an edge router based on match conditions including the particular steps of the method of FIG. 6, this disclosure contemplates any suitable method for classifying traffic on an edge router based on match conditions, which may include all, some, or none of the steps of the method of FIG. 6, where appropriate.

Although FIG. 6 describes and illustrates particular components, devices, or systems carrying out particular actions, this disclosure contemplates any suitable combination of any suitable components, devices, or systems carrying out any suitable actions.

Figure 7:
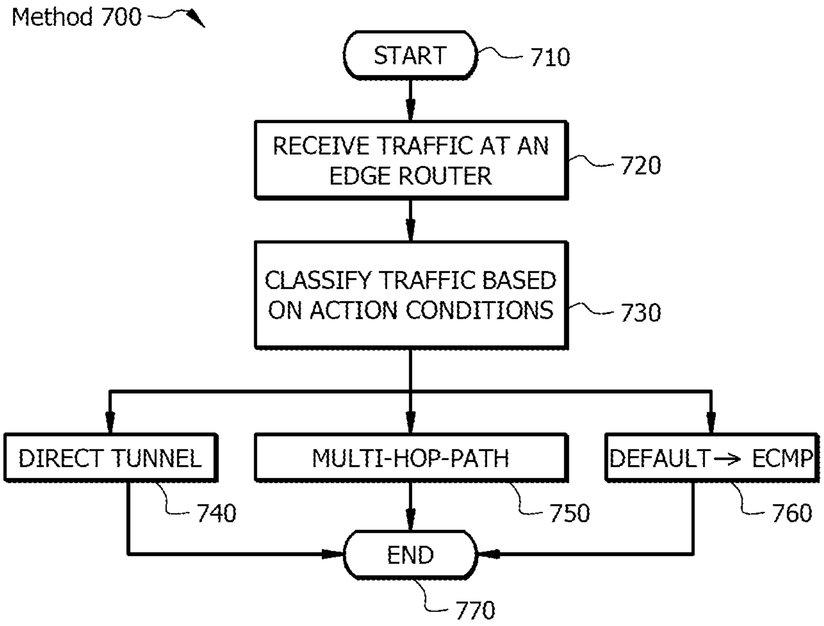
FIG. 7 illustrates a method for classifying traffic on an edge router based on action conditions, in accordance with certain embodiments.

FIG. 7 illustrates an example method 700 for classifying traffic on an edge router based on action conditions, in accordance with certain embodiments. Method 700 of FIG. 7 introduces an action based on path-preference. Traffic is matched based on whether the traffic is destined for a direct tunnel path, a multi-hop path, or a default (e.g., ECMP) path. For example, the action of path-preference may capture the choice of: (a) direct-path via a direct tunnel; (b) multi-hop-path via the border routers that transit the core region; and (c) all paths ECMP between both the direct and multi-hop paths.

Method 700 begins at step 710. At step 720 of method 700, an edge router receives traffic from the service-side of the edge router. For example, referring to FIG. 1, edge router 140*a* may receive traffic from service-side network 112. These traffic flows egress to either a primary region, a secondary region, or an other region. For example, referring to FIG. 3, these traffic flows egress to either primary region 320*a*, secondary region 320*b*, or other region 320*c*. Once the edge router receives the incoming traffic, method 700 moves from step 720 to step 730.

At step 730 of method 700, the edge router classifies the traffic based on action conditions. For example, referring to FIG. 1, classification engine 170*c* of edge router 140*c* may classify incoming traffic based on action conditions 180 (direct tunnel action condition 180*a*, multi-hop path action condition 180*b*, and default path action condition 180*c*). The policy construct of method 700 captures traffic that is destined to these various paths as a match condition in policy: match traffic to <direct tunnel/multi-hop path/default>. This construct allows the edge router to classify traffic going via direct tunnel, multi-hop path, or default (e.g., ECMP) path such that separate actions (e.g., QoS, SLA, etc.) may be applied to each aggregate.

If, at step 730, the edge router determines that the destination path is a direct tunnel path, method 700 moves to step 740, where the edge router classifies the traffic as "to-direct tunnel" traffic. For example, referring to FIG. 5, classification engine 170*c* of edge router 140*a* may match inter-region traffic 500*b* via direct tunnel 550 with to-direct tunnel classification 182*a* based on to-direct tunnel action condition 180*a*.

If, at step 730, the edge router determines that the destination path is a multi-hop path, method 700 moves to step 750, where the edge router classifies the traffic as "multi-hop path" traffic. For example, referring to FIG. 5, classification engine 170*c* of edge router 140*a* may match inter-region traffic 500*c* via hierarchical path 560 with to-multi-hop path classification 182*b* based on to-multi-hop path action condition 180*b*.

If, at step 730, the edge router determines that the destination path is the default path, method 700 moves to step 760, where the edge router classifies the traffic as "default" traffic. For example, referring to FIG. 5, classification engine 170*c* of edge router 140*a* may match intra-region traffic 500*a* with to-default classification 182*c* based on to-default path action condition 180*c*.

In certain embodiments, 'traffic-to' can be set by the edge router as: (1) 'direct tunnel', which matches all traffic going via a direct tunnel; (2) 'multi-hop', which matches all traffic going via a multi-hop path; and (3) 'default', which matches all the traffic going via a default (e.g., ECMP) path. Method 700 then moves from step 740, step 750, and step 760 to step 770, where method 700 ends. As such, method 700 has the ability to match traffic to a direct tunnel, a multi-hop path, or a default path, which greatly simplifies the policy language in a hierarchical SD-WAN network.

Although this disclosure describes and illustrates particular steps of method 700 of FIG. 7 as occurring in a particular order, this disclosure contemplates any suitable steps of method 700 of FIG. 7 occurring in any suitable order.

Although this disclosure describes and illustrates an example method 700 for classifying traffic on an edge router based on action conditions including the particular steps of the method of FIG. 7, this disclosure contemplates any suitable method for classifying traffic on an edge router based on action conditions, which may include all, some, or none of the steps of the method of FIG. 7, where appropriate.

Figure 8:
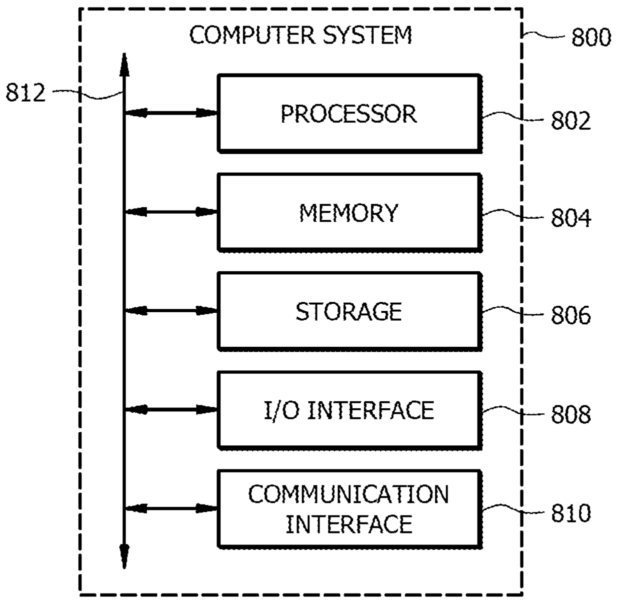
FIG. 8 illustrates an example computer system, in accordance with certain embodiments.

Although FIG. 7 describes and illustrates particular components, devices, or systems carrying out particular actions, this disclosure contemplates any suitable FIG. 8 illustrates an example computer system 800. In particular embodiments, one or more computer system 800 perform one or more steps of one or more methods described or illustrated herein. In particular embodiments, one or more computer system 800 provide functionality described or illustrated herein. In particular embodiments, software running on one or more computer system 800 performs one or more steps of one or more methods described or illustrated herein or provides functionality described or illustrated herein. Particular embodiments include one or more portions of one or more computer system 800. Herein, reference to a computer system may encompass a computing device, and vice versa, where appropriate. Moreover, reference to a computer system may encompass one or more computer systems, where appropriate.

This disclosure contemplates any suitable number of computer system 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer system 800; be unitary or distributed; span multiple locations; span multiple machines; span multiple data centers; or reside in a cloud, which may include one or more cloud components in one or more networks. Where appropriate, one or more computer system 800 may perform without substantial spatial or temporal limitation one or more steps of one or more methods described or illustrated herein. As an example, and not by way of limitation, one or more computer system 800 may perform in real time or in batch mode one or more steps of one or more methods described or illustrated herein. One or more computer system 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 202. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer system 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a LAN, a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association Local Bus (VLB), or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments disclosed herein include a method, an apparatus, a storage medium, a system and a computer program product, wherein any feature mentioned in one category, e.g., a method, can be applied in another category, e.g., a system, as well.

What is claimed is:

1. A border router comprising one or more processors and one or more computer-readable non-transitory storage media coupled to the one or more processors and including instructions that, when executed by the one or more processors, cause the border router to perform operations comprising:
- establishing connectivity between the border router and the following regions in a hierarchical software-defined wide area network (SD-WAN) network: an access region, a core region, and a service region;
- assigning a policy to each of the access region, the core region, and the service region, respectively, wherein each of the policies defines a quality of service or service level agreement that is to be applied to traffic destined for that policy's region;
- receiving traffic within the hierarchical software-defined wide area network (SD-WAN) SD-WAN network;
- identifying a destination Internet Protocol (IP) address associated with the traffic;
- determining, based at least in part on the destination IP address, a destination region of the traffic, wherein:
  - the destination region is within the hierarchical SD-WAN network;
  - the destination region is selected from a group consisting of the access region, the core region, and the service region; and
  - the border router resides at a boundary of the core region and the access region, the core region representing a core network and the access region representing a local network;
- identifying the policy assigned to the determined destination region; and
- applying the policy to the traffic.

2. The border router of claim 1, wherein the policy assigned to the core region is associated with a premium transport service that provides a required level of performance and cost effectiveness for long-distance connectivity.

3. The border router of claim 1, wherein the border router provides inter-region connectivity by connecting the access region and another access region to a common backbone overlay.

4. The border router of claim 1, wherein the border router configures secure tunnels to other routers and encrypts packets that traverse the secure tunnels to the other routers.

5. The border router of claim 1, wherein the border router uses virtual private network (VPN) forwarding tables to route traffic flows between tunnel interfaces that provide connectivity to the core region and second tunnel interfaces that provide connectivity to the access region.

6. The border router of claim 1, wherein the border router sends and receives data to other border routers within the hierarchical SD-WAN network.

7. A method performed by a border router, comprising:
- establishing connectivity between a border router and the following regions in a hierarchical software-defined wide area network (SD-WAN) network: an access region, a core region, and a service region;
- assigning a policy to each of the access region, the core region, and the service region, respectively, wherein each of the policies defines a quality of service or service level agreement that is to be applied to traffic destined for that policy's region;
- receiving traffic within the hierarchical software-defined wide area network (SD-WAN) SD-WAN network;
- identifying a destination Internet Protocol (IP) address associated with the traffic;
- determining and based at least in part on the destination IP address, a destination region of the traffic, wherein:
  - the destination region is within the hierarchical SD-WAN network;
  - the destination region is selected from a group consisting of the access region, the core region, and the service region; and the border router resides at a boundary of the core region and the access region, the core region representing a core network and the access region representing a local network;

identifying the policy assigned to the determined destination region; and applying the policy to the traffic.

8. The method of claim 7, wherein the police assigned to the core region is associated with a premium transport service that provides a required level of performance and cost effectiveness for long-distance connectivity.

9. The method of claim 7, wherein the border router provides inter-region connectivity by connecting the access region and another access region to a common backbone overlay.

10. The method of claim 7, wherein the border router configures secure tunnels to other routers and encrypts packets that traverse the secure tunnels to the other routers.

11. The method of claim 7, wherein the border router uses virtual private network (VPN) forwarding tables to route traffic flows between tunnel interfaces that provide connectivity to the core region and second tunnel interfaces that provide connectivity to the access region.

12. The method of claim 7, wherein the border router sends and receives data to other border routers within the hierarchical SD-WAN network.

13. The method of claim 7, wherein the border router configures secure tunnels to other routers and encrypts packets that traverse the secure tunnels to the other routers.

14. One or more computer-readable non-transitory storage media embodying instructions that, when executed by a processor, cause the processor to perform operations comprising:

establishing, by a border router, connectivity between the border router and the following regions in a hierarchical software-defined wide area network (SD-WAN) network: an access region, a core region, and a service region;

assigning, by the border router, a policy to each of the access region, the core region, and the service region, respectively, wherein each of the policies defines a quality of service or service level agreement that is to be applied to traffic destined for that policy's region;

receiving, by the border router, traffic within the hierarchical software-defined wide area network (SD-WAN) SD-WAN network;

identifying, by the border router, a destination Internet Protocol (IP) address associated with the traffic;

determining, by the border router and based at least in part on the destination IP address, a destination region of the traffic, wherein:

the destination region is within the hierarchical SD=WA N network;

the destination region is selected from a group consisting of the access region, the core region, and the service region; and the border router resides at a boundary of the core region and the access region, the core region representing a core network and the access region representing a local network;

identifying, by the border router, the policy assigned to the determined destination region; and applying, by the border router, the policy to the traffic.

15. The one or more computer-readable non-transitory storage media of claim 14, wherein the border router provides inter-region connectivity by connecting the access region and another access region to a common backbone overlay.

16. The one or more computer-readable non-transitory storage media of claim 14, wherein the border router uses virtual private network (VPN) forwarding tables to route traffic flows between tunnel interfaces that provide connectivity to the core region and second tunnel interfaces that provide connectivity to the access region.

17. The one or more computer-readable non-transitory storage media of claim 14, wherein the border router sends and receives data to other border routers within the hierarchical SD-WAN network.

* * * * *